United States Patent
McDade et al.

(10) Patent No.: US 7,894,459 B2
(45) Date of Patent: Feb. 22, 2011

(54) DETERMINING AVAILABILITY OF A NETWORK SERVICE

(75) Inventors: Iain McDade, Hamilton (GB); John Monaghan, Clydebank (GB); Samer M. Salam, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 887 days.

(21) Appl. No.: 11/635,850

(22) Filed: Dec. 8, 2006

(65) Prior Publication Data

US 2008/0140825 A1    Jun. 12, 2008

(51) Int. Cl.
  *H04L 12/26* (2006.01)
(52) U.S. Cl. .................................. 370/401; 709/224
(58) Field of Classification Search .......... 370/241, 370/242, 244, 245, 248, 249, 252, 400, 401; 709/223, 224, 244
See application file for complete search history.

(56) References Cited

U.S. PATENT DOCUMENTS

| | | | | |
|---|---|---|---|---|
| 6,073,172 | A * | 6/2000 | Frailong et al. | 709/227 |
| 6,954,798 | B2 * | 10/2005 | Eastham | 709/238 |
| 7,127,526 | B1 * | 10/2006 | Duncan et al. | 709/249 |
| 7,181,519 | B2 * | 2/2007 | Pillai et al. | 709/224 |
| 7,363,361 | B2 * | 4/2008 | Tewari et al. | 709/223 |
| 7,478,151 | B1 * | 1/2009 | Maiocco et al. | 709/223 |
| 7,512,687 | B2 * | 3/2009 | Jung | 709/227 |
| 2005/0076122 | A1 * | 4/2005 | Khawand et al. | 709/226 |
| 2005/0220034 | A1 * | 10/2005 | Zaniolo et al. | 370/252 |
| 2007/0189152 | A1 * | 8/2007 | Tamura et al. | 370/216 |

OTHER PUBLICATIONS

Cisco Systems, Inc., "Ethernet Operations, Administration, and Maintenance," White Paper, Sep. 2006, pub. by Cisco Systems, Inc., San Jose, California, 14 pp.
Cisco Systems, Inc., "OAM for Carrier Ethernet Networks—End-to-End Manageability to the Customer Premises," Q&A Document, Sep. 2006, pub. by Cisco Systems, Inc., San Jose, California, 6 pp.
Ohta, Hiroshi, "Ethernet OAM and Protection Switching," presentation slides for ITU-T Workshop "NGN and its Transport Networks," Kobe, Japan, Apr. 20, 2006, pub. by International Telecommunication Union, 17 pp.
Metro Ethernet Forum, "Technical Specification, MEF 4, Metro Ethernet Network Architecture Framework—Part 1: Generic Framework," May 2004, pub. by The Metro Ethernet Forum, 26 pp.
Metro Ethernet Forum, "Introducing the Specifications of the Metro Ethernet Forum," presentation slides, Mar. 2007, 14 pp.

* cited by examiner

*Primary Examiner*—Pankaj Kumar
*Assistant Examiner*—Duc T Duong
(74) *Attorney, Agent, or Firm*—Hickman Palermo Truong & Becker LLP

(57) ABSTRACT

An apparatus and method for determining availability of a network service having a plurality of end points are described. The apparatus and method are arranged to receive a service notification from the service end point notifying availability of a service at the service end point and indicating other service end points for said service, and to identify said service as available if all service end points for said service have notified availability for said service.

34 Claims, 7 Drawing Sheets

| END POINT | SERVICE | UP? |
|---|---|---|
| 1 | 1 | Y |
|   | 2 | Y |
| 2 | 1 | Y |
|   | 2 | Y |
| 3 | 1 | Y |
| 4 | 2 | N |

Fig. 3

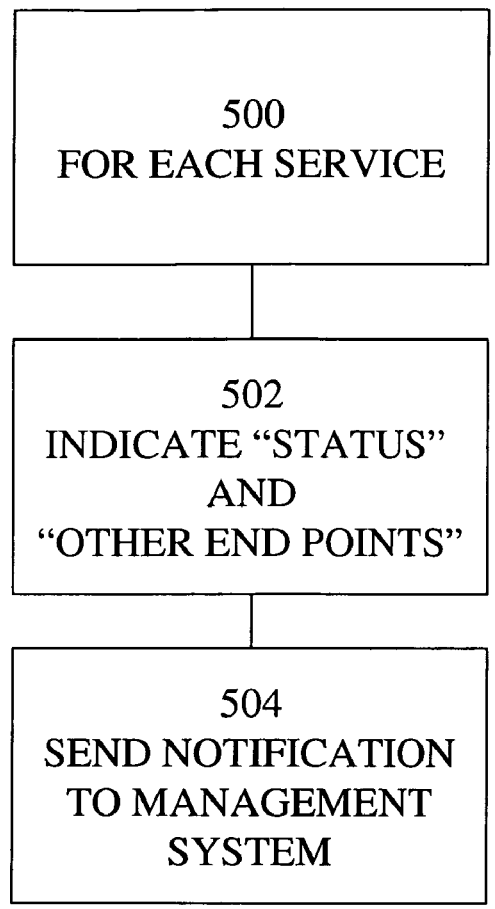
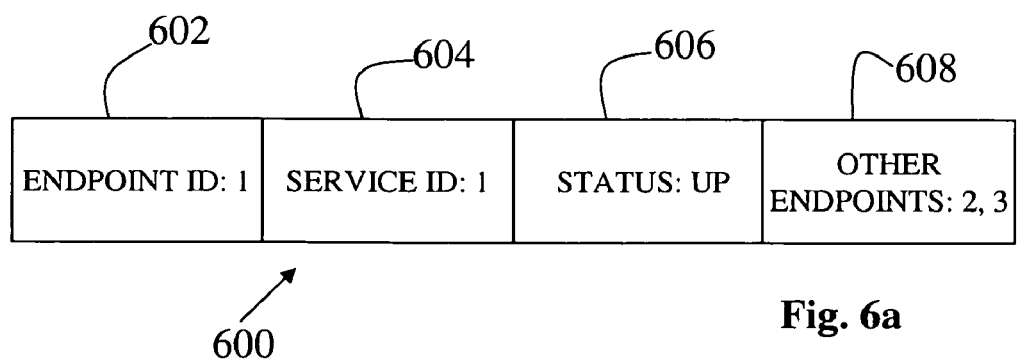

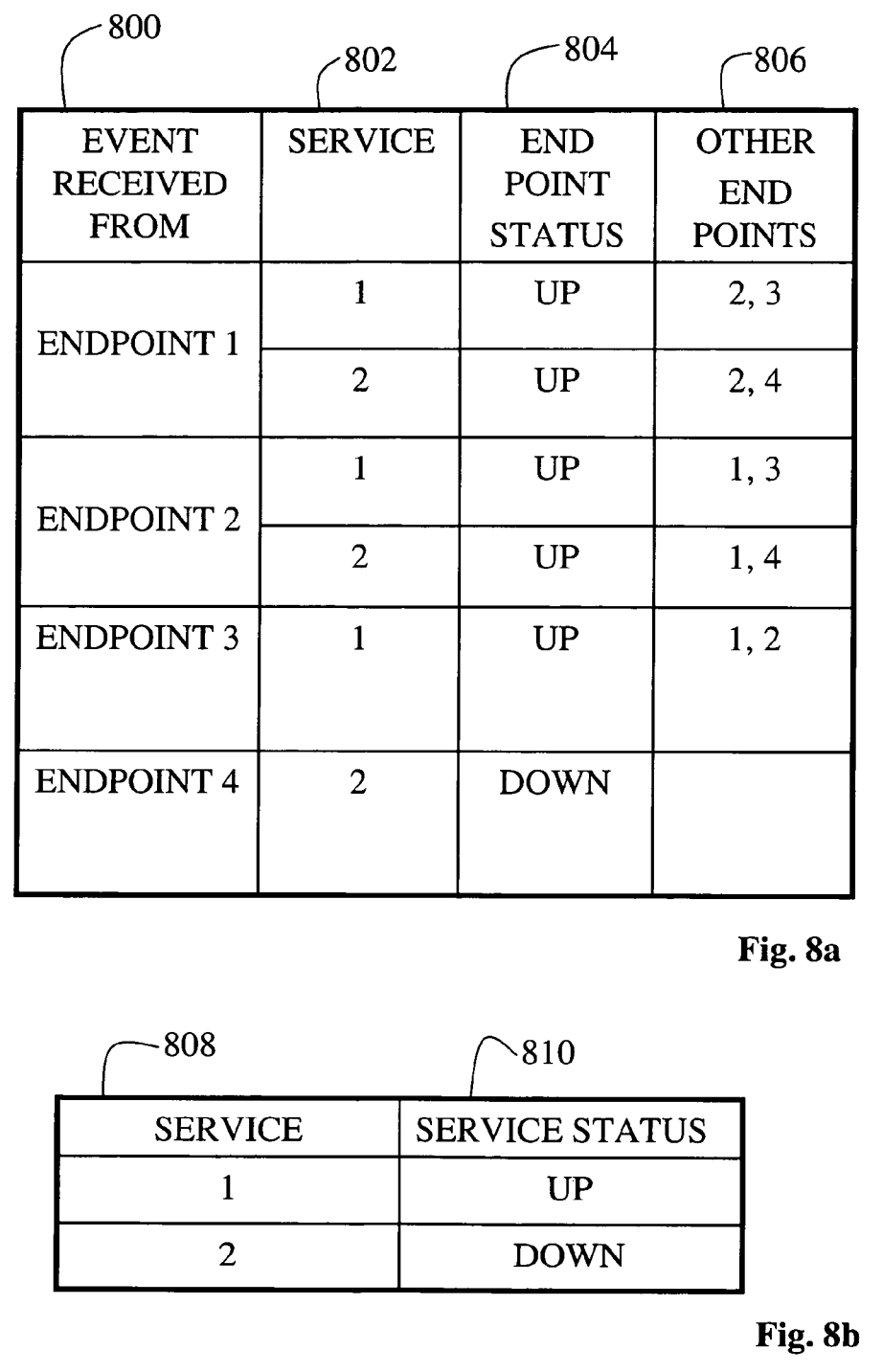

| EVENT RECEIVED FROM | SERVICE | END POINT STATUS | OTHER END POINTS |
|---|---|---|---|
| ENDPOINT 1 | 1 | UP | 2, 3 |
|  | 2 | UP | 2, 4 |
| ENDPOINT 2 | 1 | UP | 1, 3 |
|  | 2 | UP | 1, 4 |
| ENDPOINT 3 | 1 | UP | 1, 2 |
| ENDPOINT 4 | 2 | DOWN |  |

Fig. 8a

| SERVICE | SERVICE STATUS |
|---|---|
| 1 | UP |
| 2 | DOWN |

Fig. 8b

DETERMINING AVAILABILITY OF A NETWORK SERVICE

TECHNICAL FIELD

The present disclosure relates to managing a network service, for example a virtual private network (VPN) service.

BACKGROUND

A VPN service comprises a service between a plurality of devices acting as service end points which are managed by a manager such as a service manager including a service station for a network administrator. The service end points are connected over any appropriate medium. For example the service end points can comprise clients connected over the internet. Any number of service end points can belong to a virtual private network. Any individual device can belong to multiple disparate virtual private network services acting as a discrete service end point for each service.

For a service provider, an essential part of the provisioning process for VPN services such as layer 2 Ethernet VPN services is to determine that once any necessary changes have been made to the network elements, the service is operational. Traditionally, this requires either a management system to perform some form of connectivity test between the service end points, or for a manual test to be carried out. In the case of services such as layer 2 Ethernet services, this is further complicated by the fact that there is currently no consistently available mechanism for testing connectivity at the Ethernet layer. Hence a layer 3 overlay is often introduced purely for the purpose of verifying reachability.

For example in the case of the IEEE 802.1ag Draft 7 protocol, a description of which is available at the time of this writing in the file "820.1ag.html" in the folder/1/pages/of the domain ieee802.org on the World Wide Web, this provides mechanisms to detect and troubleshoot service effecting faults within a network such as a Metro Ethernet network of the kind described, at the time of writing in "*Metro Ethernet Forum Specification MEF* 4, Metro Ethernet Network Architecture Framework—Part 1: Generic Framework."

In one approach a service end point sends a protocol dependent message such as "service up" or "no defect" in any appropriate protocol such as simple network management protocol (SNMP) and the management station marks the end point as "up". If a message is not received from an expected end point within a specified time period then it is considered faulty and provisioning has failed. Conversely, if messages are received from all end points within a service within the time period, the service is considered healthy and provisioning is considered to have succeeded.

In both cases events are generated at the end points in the form of SNMP notifications to inform the management station of the status which may be "service up" or "missing end-point" as appropriate. However the management station is only able to report the status from the perspective of each end point—not for the overall service.

As a result the management system must have intimate knowledge of the provisioning operations in order to form the subsequent post-provisioning tests. For example the management system needs to know the network elements, the VLANs (virtual local area networks), ports and access credentials in order to contact the service end points. This further complicates the process because of the additional overhead placed on the management system. Existing solutions to this type of problem require explicitly testing the service using standard tools such as "ping" and "trace" which must be activated and coordinated by a network management system, or performed manually.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is a representation of a status information table maintained by the management station according to the approach shown in FIG. 2;

FIG. 5 is a flow diagram illustrating in more detail the steps performed at a service end point according to an embodiment;

FIG. 6*a* is a representation of a notification from an origin service end point in relation to a first service according to an embodiment;

FIG. 8*a* is a representation of an end point availability table maintained at a management station according to an embodiment;

FIG. 8*b* is a representation of a service availability table maintained at a management station according to an embodiment.

DETAILED DESCRIPTION OF THE PREFERRED EMBODIMENT

A method and apparatus for determining availability of a network service is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Apparatus and method for determining availability of a network service
4.0 Implementation Mechanisms—Hardware Overview
5.0 Extensions and Alternatives 1.0 General Overview The needs identified in the foregoing Background, and other needs and objects that will become apparent for the following description, are achieved in the present invention, which comprises, in one aspect, an apparatus and method for determining availability of a network service having a plurality of service end points, the apparatus being arranged to receive a service notification from a service end point notifying availability of a service at the service end point and indicating other service end points for said service, and to identify said service as available if all service end points for said service have notified availability for said service.

In other aspects, the invention encompasses a computer apparatus and a computer-readable medium configured to carry out the foregoing steps. The approach further extends to a computer readable medium comprising one or more sequences of instructions for determining availability of a network service and an apparatus for determining availability of a network service including a computer readable medium comprising one or more sequences of instructions for determining availability of a network service.

2.0 Structural and Functional Overview

Figure 1:
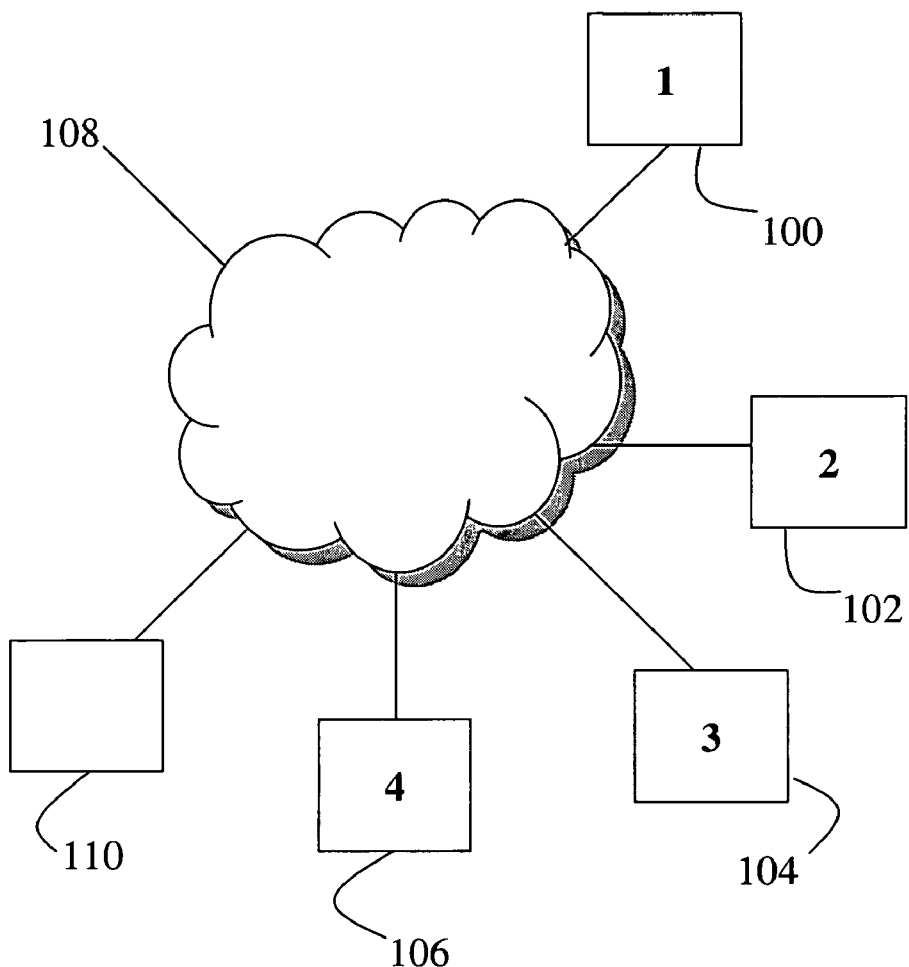
FIG. 1 is a representation of a VPN in relation to which the method described may be applied.

A simple example of a plurality of virtual private network services is shown in FIG. 1 which is a simplified diagram showing VPN services and in which four service end points (end points 1 to 4) reference numerals 100, 102, 104, 106 respectively are connected over a network, for example the internet 108, with a service manager 110. In the example shown, end points 1, 2 and 3 belong to a first service which has an identifier "service 1" and end points 1, 2 and 4 are connected to a second service which has an identifier "service 2".

Figure 2:
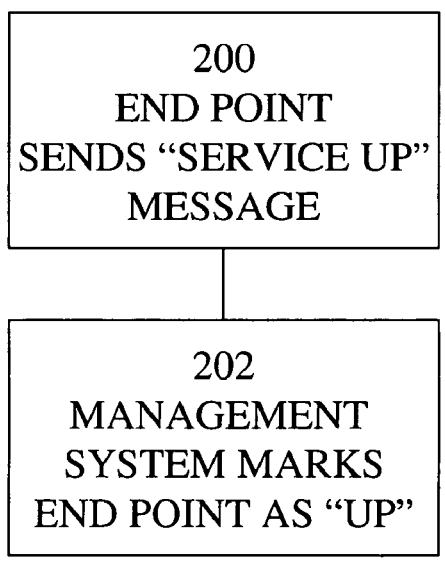
FIG. 2 is a flow diagram illustrating the steps performed by the service end-point and management system.

FIG. 2 is a flow diagram showing the steps performed at a service end point in such a network. At step 200 a service end point sends a protocol dependent message such as "service up" or "no defect" in any appropriate protocol such as simple network management protocol (SNMP) and, at step 202, the management station marks the end point as "up". If a message is not received from an expected end point within a specified time period then it is considered faulty and provisioning has failed. Conversely, if messages are received from all end points within a service within the time period, the service is considered healthy and provisioning is considered to have succeeded.

Figure 3:
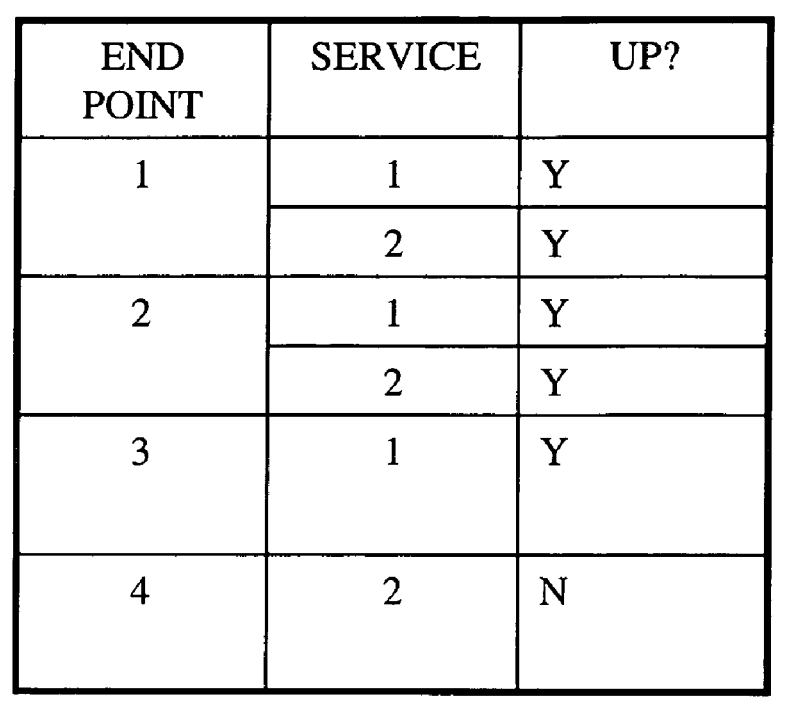

In both cases events are generated at the end points in the form of SNMP notifications to inform the management station of the status which may be "service up" or "missing end-point" as appropriate. The management station typically is only able to report the status from the perspective of each end point—not for the overall service. In particular, referring to FIG. 3, which is a schematic view of a status information table at the service manager, if the management station receives confirmation for services 1 and/or 2 from each of end points 1 to 3 but does not receive a notification from end point 4 then each of the end points except for end-point 4 is marked as up on a per-service basis. However, the subsequent "post-provisioning" check to establish that the service as a whole is up for all service end points is disjoint, which introduces delays and additional operational expenditure into the overall process.

Figure 4:
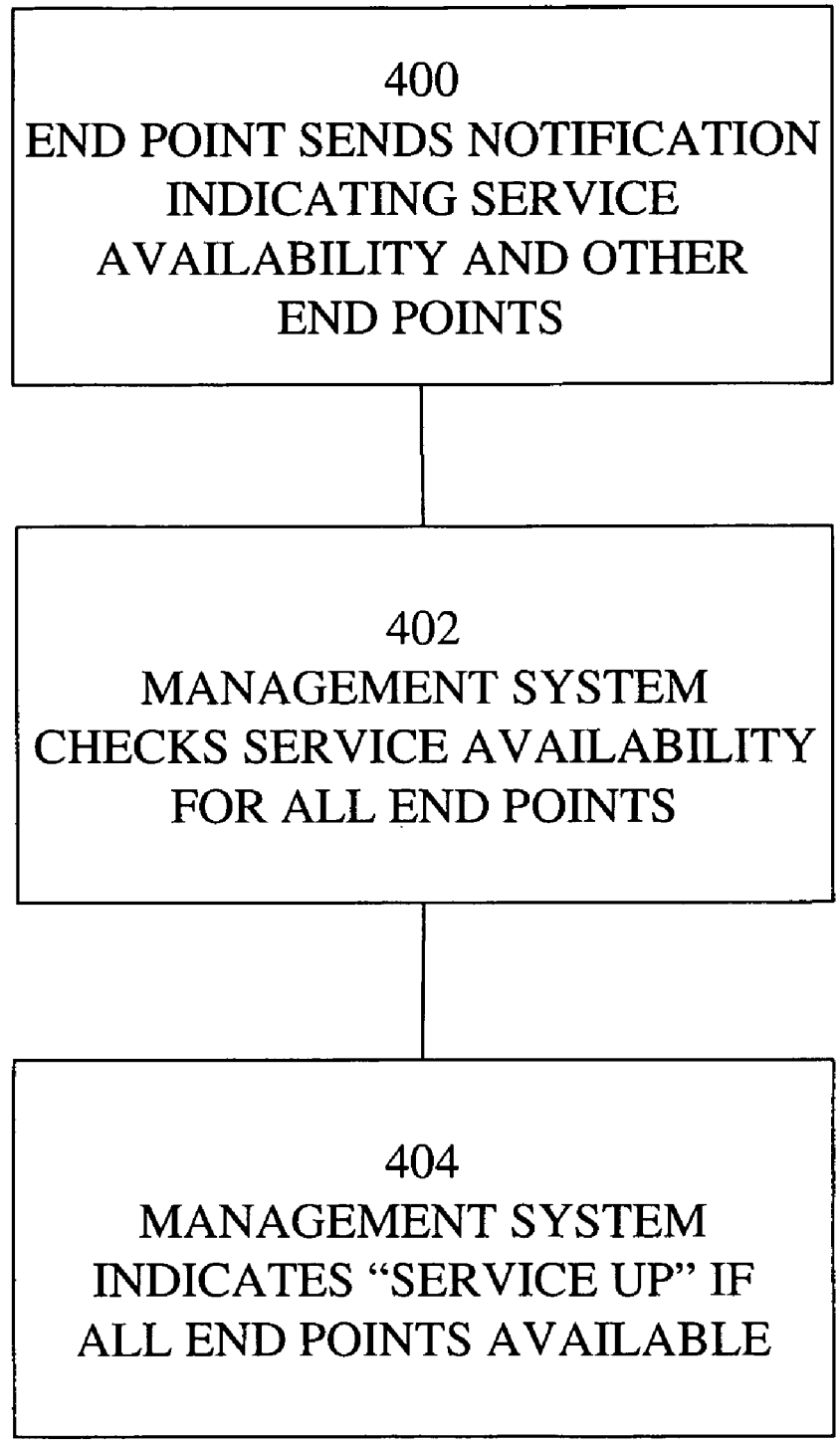
FIG. 4 is a flow diagram illustrating at a high level implementation of an embodiment.

Embodiments can be understood in overview with reference to FIG. 4 which is a flow diagram illustrating the steps performed for determining availability of a network service such as a VPN service. The service has a plurality of fully marked service end points, that is, each service end/point has data connectivity with each other service end point. At step 400 an end point sends a service notification notifying availability of a service at that end point and also indicates the same notification the other service end points for said service, for example as an SNMP message over a network such as a Metro Ethernet network. At step 402 the management station such as a network management station (NMS) checks the service availability for all of the end points indicated in the notification and at step 404 the management station indicates the service as available if all service end points for the service have notified availability for the service.

As a result of this approach a management system that was not involved in the provisioning process can nonetheless verify service availability without requiring intimate knowledge of the intended service. Hence a fault management system can simply listen for events and perform simple correlation to determine that the overall system is operational.

3.0 Apparatus and Method for Determining Availability of a Network Service.

Figure 6B:
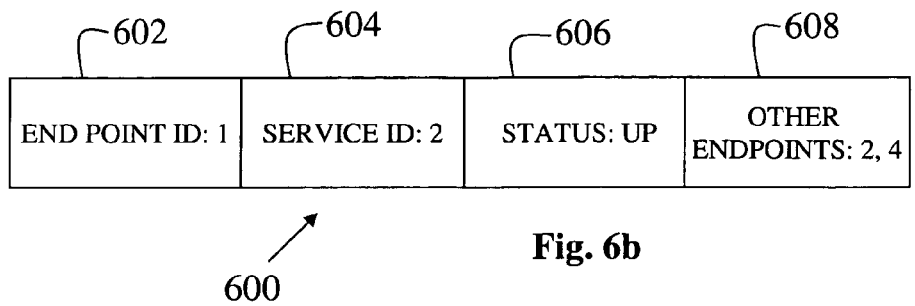
FIG. 6*b* is a representation of a notification from an origin service end point in relation to a second service according to an embodiment.
Figure 7:
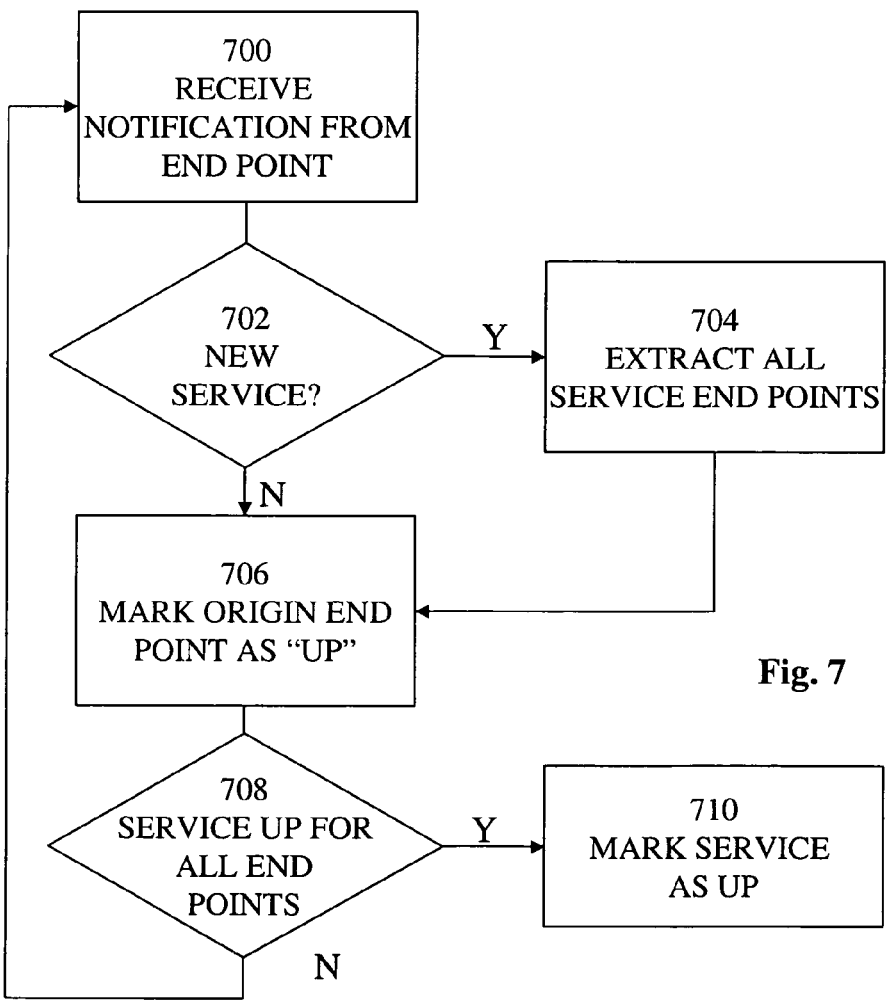
FIG. 7 is a flow diagram illustrating in more detail the steps performed at a management station according to an embodiment.

The approach can be understood in more detail with reference to the flow diagrams of FIGS. 5 and 7, which show the steps performed at the service end point and management station respectively, FIGS. 6a and 6b which show notifications from a service end point according to the approach described herein and FIGS. 8a and 8b which show the service end point and service availability tables respectively maintained at the management station, in schematic form, according to the approach described herein. The approach may be implemented in relation to a VPN service on a Metro Ethernet network. The operation of Metro Ethernet networks is well known to the skilled reader such that detailed description is not required. According to the configuration of Metro Ethernet networks, when a VPN service is implemented comprising multiple end points, each end point can be provisioned, for example manually, with information identifying all of the other end points in the same service. Of course the approach may be implemented in relation to any other appropriate form of network where the service end points can be provisioned with information relating to the other service end points belonging to a VPN service. The approach is described with reference, once again, to the simplified network scenario shown in FIG. 1 but it will be appreciated that it can be applied to any kind of network configuration of any complexity, with any number of service end points and services.

Referring to FIG. 5, at step 500, from a network element comprising an origin service end point, an event is generated informing the management system that from its perspective the service is operational. For example this event can originate from the IEEE 802.1ag protocol described above. This is termed the service up event. In particular, at step 502, the event or notification indicates both the status of the origin service end point (service up) and identifies the other end points within the service. At step 504 the notification is sent to the management system using any appropriate standard approach, for example, in accordance with the IEEE 802.1ag protocol, for example using SNMP.

Referring to FIG. 6a, therefore, in relation to a first service, "service 1", a service end point acting as an origin end point sends a notification shown as generally 600 including fields 602 identifying the origin end point as "end point 1", field 604 identifying the service as "service 1", field 606 identifying the corresponding service as "service up" and field 608 identifying the other service end points for "service 1" as end points 2 and 3. FIG. 6b shows the corresponding notification for end point 1 and service 2, with other end points 2 and 4.

Referring now to FIG. 7, the corresponding steps performed at the management system can be seen. At step 700 the management system receives the "service up" event for the service identified by the service ID from the end point. At step 702 if a service up event has not been received for the service ID before then all the end points in the service are extracted from the notification including the origin end point and the other end points detailed in the event at step 704 thereafter. If the service is not a new service or if all service end points have been extracted, then at step 706, the sending end point is marked as "service up" for the service.

At step 708 the management system then checks to establish whether all of the end points associated with the service are up and if so, at step 710, the overall service is marked as "up". If not then the management system can return to a waiting state prior to receiving further notifications at step 700. A time out step is implemented which can, for example, trigger check messages from the management system to any end points identified as belonging to a service which has not responded so that the management station does not wait indefinitely. The timer can be set automatically or user configured as appropriate and, if responses are received to the check message then the additional end points can be indicated as up for that service and, if all end points have responded, the service marked as "up". If not all the end-points have sent a "service up" message within the pre-defined timeout period then the overall service is marked as non-available.

Referring to FIG. 8*a*, information received by the management system can be further understood. It will be appreciated that the information can be stored and presented in any appropriate form and location and that the specific form shown FIG. 8*a* is for the purposes of example only. The management system stores information relating to the origin service end point from which information is received (column 800), the respective service or services corresponding to the origin service end point (column 802), the origin service end point status for each service (column 804) and other end points corresponding to each service (806).

As each event is received the table is populated. For example once origin service end point 1 has notified its availability for services 1 and 2 then the services are entered against it in column 802, its specific status is indicated as up in column 804 and the other end points, as identified in the notification, are also included 806. Hence it will be seen that not only end points 2 and 3 (which in the example shown are considered also to have indicated their availability for the respective services) but also end point 4 are listed on the table. However, end point 4 includes a default "down" status indication and the "other end points" field has not been populated as no response has been received from end point 4 according to the specific example described above.

Referring to FIG. 8*b* the service availability information can be derived by the management system from the information provided from the end points. This may be stored in the same or a different storage structure as that shown in FIG. 8*b*, and again any appropriate storage structure location and approach may be adopted. In particular, referring to FIG. 8*b*, it can be seen that there is a service field (column 808) and a service status field (810). Service 1 has the service status "up" and service 2 has the service status "down".

As a result it will be seen that by ensuring that the "service up" event contains the identity of other end points that have been statically defined on each network element that contains a service end point, the management system can perform correlation of all "service up" events by determining when all have been received and hence declare that the overall service is operational, at which point the service is ready to carry customer traffic.

The approach can be implemented on any appropriate network where the service end points contain the relevant information. For example multipoint Metro Ethernet services are fully meshed by default, allowing the management system to correlate all the events and generate a single event indicating that the overall service is up. Each service has a unique identifier which can take any appropriate form, which is used by the end points of the service to allow the management system to correctly identify and correlate service up events for multiple services from multiple end points. Hence a network management station or other form of management system can inform operators that a newly provisioned Metro Ethernet or other network service is operational, without having any prior knowledge of the planned service nor how that service was provisioned.

It will be appreciated that the approaches described herein can be extended to any appropriate virtual private network or equivalent network at the layer 2 level or equivalent level in other architectures. For example the approach extends to networks that are neither private nor virtual or which are intended to be fully meshed providing a full mesh of connectivity between multiple end points such as LAN providing a full mesh of connectivity between end points. Any suitable notification system and protocol can be adopted for indicating availability and extracting the "other end point" information for inclusion in the notification. Similarly any appropriate algorithm can be implemented for extracting the other end point information from the notifications and constructing service availability at the management system, and information can be stored in any appropriate form and configuration, and at any appropriate location.

The steps described can be implemented in hardware, software or firmware as appropriate and the approach can be implemented in any appropriate manner for example by a service provider within a service ordering provisioning management systems to allow them to inform their end-customers when their service was available and hence begin billing.

4.0 Implementation Mechanisms—Hardware Overview

Figure 9:
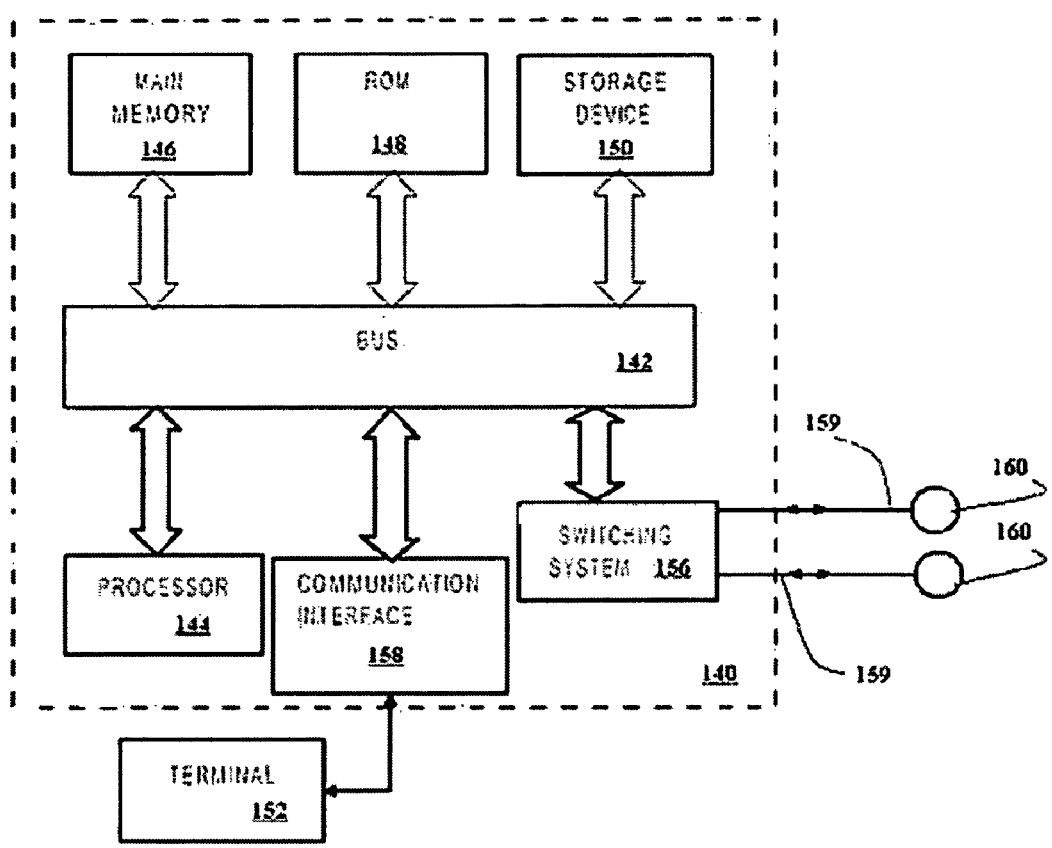
FIG. 9 is a block diagram that illustrates a computer system upon which an embodiment may be implemented.

FIG. 9 is a block diagram that illustrates a computer system 40 upon which the method may be implemented. The method is implemented using one or more computer programs running on a network element such as a router device or service end point or management service station.

Computer system 140 includes a bus 142 or other communication mechanism for communicating information, and a processor 144 coupled with bus 142 for processing information. Computer system 140 also includes a main memory 146, such as a random access memory (RAM), flash memory, or other dynamic storage device, coupled to bus 142 for storing information and instructions to be executed by processor 144. Main memory 146 may also be used for storing temporary variables or other intermediate information during execution of instructions to be executed by processor 144. Computer system 140 further includes a read only memory (ROM) 148 or other static storage device coupled to bus 142 for storing static information and instructions for processor 144. A storage device 150, such as a magnetic disk, flash memory or optical disk, is provided and coupled to bus 142 for storing information and instructions.

A communication interface 158 may be coupled to bus 142 for communicating information and command selections to processor 144. Interface 158 is a conventional serial interface such as an RS-232 or RS-422 interface. An external terminal 152 or other computer system connects to the computer system 140 and provides commands to it using the interface 158. Firmware or software running in the computer system 140 provides a terminal interface or character-based command interface so that external commands can be given to the computer system.

A switching system 156 is coupled to bus 142 and has an input interface and a respective output interface (commonly designated 159) to external network elements. The external network elements may include a plurality of additional routers 160 or a local network coupled to one or more hosts or routers, or a global network such as the Internet having one or more servers. The switching system 156 switches information traffic arriving on the input interface to output interface 159 according to pre-determined protocols and conventions that are well known. For example, switching system 156, in cooperation with processor 144, can determine a destination of a packet of data arriving on the input interface and send it to the correct destination using the output interface. The destinations may include a host, server, other end stations, or other routing and switching devices in a local network or Internet.

The computer system 140 implements as a management system or service end point the above described method of forwarding data. The implementation is provided by computer system 140 in response to processor 144 executing one or more sequences of one or more instructions contained in main memory 146. Such instructions may be read into main memory 146 from another computer-readable medium, such as storage device 150. Execution of the sequences of instructions contained in main memory 146 causes processor 144 to perform the process steps described herein. One or more processors in a multi-processing arrangement may also be employed to execute the sequences of instructions contained in main memory 146. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 144 for execution. Such a medium may take many forms, including but not limited to, non-volatile media and volatile media. Non-volatile media includes, for example, optical or magnetic disks, such as storage device 150. Volatile media includes dynamic memory, such as main memory 146.

Common forms of computer-readable media include, for example, a floppy disk, a flexible disk, hard disk, magnetic tape, or any other magnetic medium, a CD-ROM, any other optical medium, punch cards, paper tape, a RAM, a PROM, and EPROM, a FLASH-EPROM, any other memory chip or cartridge, or any other medium from which a computer can read.

Various forms of computer readable media may be involved in carrying one or more sequences of one or more instructions to processor 144 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infrared transmitter to convert the data to an infrared signal. An infrared detector coupled to bus 142 can receive the data carried in the infrared signal and place the data on bus 142. Bus 142 carries the data to main memory 146, from which processor 144 retrieves and executes the instructions. The instructions received by main memory 146 may optionally be stored on storage device 150 either before or after execution by processor 144.

Interface 159 also provides a two-way data communication coupling to a network link that is connected to a local network. For example, the interface 159 may be an integrated services digital network (ISDN) card or a modem to provide a data communication connection to a corresponding type of telephone line. As another example, the interface 159 may be a local area network (LAN) card to provide a data communication connection to a compatible LAN. Wireless links may also be implemented. In any such implementation, the interface 159 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the world wide packet data communication network now commonly referred to as the "Internet". The local network and the Internet both use electrical, electromagnetic or optical signals that carry digital data streams. The signals through the various networks and the signals on the network link and through the interface 159, which carry the digital data to and from computer system 140, are exemplary forms of carrier waves transporting the information.

Computer system 140 can send messages and receive data, including program code, through the network(s), network link and interface 159. In the Internet example, a server might transmit a requested code for an application program through the Internet, ISP, local network and communication interface 158. One such downloaded application provides for the method as described herein.

The received code may be executed by processor 144 as it is received, and/or stored in storage device 150, or other non-volatile storage for later execution.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

The method steps set out above can be carried out in any appropriate order and aspects from the examples and embodiments described juxtaposed or interchanged as appropriate.

What is claimed is:

1. An apparatus for determining availability of a network service having a plurality of service end points, the apparatus comprising:
   one or more processors; and
   a memory storing instructions which, when processed by the one or more processors,
   cause:
   receiving a service notification from a service end point notifying availability of a service at the service end point and indicating other service end points for said service; and
   identifying said service as available if all service end points for said service have notified availability for said service.

2. An apparatus as claimed in claim 1 in which the apparatus is a service manager.

3. An apparatus as claimed in claim 2 in which the service manager includes a fault management system.

4. An apparatus as claimed in claim 1 in which the service end points are fully marked.

5. An apparatus as claimed in claim 1 in which the service is a virtual private network (VPN) service.

6. An apparatus as claimed in claim 5 in which the service is a layer 2 VPN service.

7. An apparatus as claimed in claim 5 further arranged to implement the VPN service if it is identified as available.

8. An apparatus as claimed in claim 1 further comprising at least one service end point arranged to construct a service notification indicating a service as available and indicating other service end points for that service.

9. An apparatus as claimed in claim 1 in which, if a notification indicates a new service then the apparatus is arranged to extract service availability for all other service end points for said service from respective service notifications.

10. An apparatus as claimed in claim 1 arranged to implement a predetermined action if the service is identified as non-available.

11. An apparatus as claimed in claim 10 arranged to send a notification to one or more service end points which have not notified availability for the service.

12. An apparatus for determining availability of a network service having a plurality of service end points, comprising:
   means for receiving a service notification from a service end point notifying availability of a service at the service end point and indicating other service end points for said service, and
   means for identifying said service as available if all service end points for said service have notified availability for said service.

13. An apparatus as claimed in claim 12 in which the apparatus is a service manager.

14. An apparatus as claimed in claim 12 in which the service is a virtual private network (VPN) service.

15. An apparatus as claimed in claim 14 in which the service is a layer 2 VPN service.

16. An apparatus as claimed in claim 12 further comprising at least one service end point arranged to construct a service notification indicating a service as available and indicating other service end points for that service.

17. An apparatus as claimed in claim 12 in which, if a notification indicates a new service then the apparatus is arranged to extract service availability for all other service end points for said service from respective service notifications.

18. An apparatus as claimed in claim 12 arranged to implement a predetermined action if the service is identified as non-available.

19. An apparatus as claimed in claim 18 arranged to send a notification to one or more service end points which have not notified availability for the service.

20. A method of determining availability of a network service having a plurality of service end points, comprising:
   receiving a service notification from a service end point notifying availability of a service at a service end point and indicating other service end points for said service, and
   identifying said service as available if all service end points for said service have notified availability for said service.

21. A method as claimed in claim 20 further comprising constructing a service notification indicating a service as available and indicating other service end points for that service.

22. A method as claimed in claim 20 in which, if a notification identifies a new service, service availability is extracted for all other service end points for said service.

23. A method as claimed in claim 20 in which the service is implemented if it is identified as available.

24. A method as claimed in claim 20 in which a predetermined action is implemented if the service is identified as non-available.

25. A method as claimed in claim 20 in which a notification is sent to one or more service end points which have not notified availability for the service.

26. A non-transitory computer readable medium for determining availability of a network service, the computer-readable medium storing instructions which, when processed by one or more processors, cause:
   receiving a service notification from a service end point notifying availability of a service at a service end point and indicating other service end points for said service, and
   identifying said service as available if all service end points for said service have notified availability for said service.

27. A non-transitory computer readable medium as claimed in claim 26, in which the service end points are fully marked.

28. A non-transitory computer readable medium as claimed in claim 26, in which the service is a virtual private network (VPN) service.

29. A non-transitory computer readable medium as claimed in claim 26, in which the service is a layer 2 VPN service.

30. A non-transitory computer readable medium as claimed in claim 26, further comprising instructions which, when processed by the one or more processors, cause constructing a service notification indicating a service as available and indicating other service end points for that service.

31. A non-transitory computer readable medium as claimed in claim 30, further comprising instructions which, when processed by the one or more processors, cause
   extracting service availability for all other service end points for said service from respective service notifications if a notification indicates a new service.

32. A non-transitory computer readable medium as claimed in claim 26, further comprising instructions which, when executed by the one or more processors, cause implementing the VPN service if it is identified as available.

33. A non-transitory computer readable medium as claimed in claim 26, further comprising instructions which, when executed by the one or more processors, cause implementing a predetermined action if the service is identified as non-available.

34. A non-transitory computer readable medium as claimed in claim 26, further comprising instructions which, when executed by the one or more processors, cause sending a notification to one or more service end points which have not notified availability for the service.

* * * * *